United States Patent
Okuda et al.

(10) Patent No.: US 12,444,282 B2
(45) Date of Patent: Oct. 14, 2025

(54) CRIME PREVENTION SYSTEM AND CRIME PREVENTION METHOD

(71) Applicant: Mitsubishi Electric Corporation, Tokyo (JP)

(72) Inventors: Satoshi Okuda, Tokyo (JP); Masaharu Hattori, Tokyo (JP); Yasuki Aihara, Tokyo (JP); Takashi Takenaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/692,866

(22) PCT Filed: Dec. 21, 2021

(86) PCT No.: PCT/JP2021/047388
§ 371 (c)(1),
(2) Date: Mar. 18, 2024

(87) PCT Pub. No.: WO2023/119436
PCT Pub. Date: Jun. 29, 2023

(65) Prior Publication Data
US 2024/0428666 A1    Dec. 26, 2024

(51) Int. Cl.
G08B 13/196 (2006.01)
G01J 5/00 (2022.01)
G01J 5/08 (2022.01)

(52) U.S. Cl.
CPC ...... *G08B 13/19602* (2013.01); *G01J 5/0025* (2013.01); *G01J 5/0859* (2013.01); *G01J 2005/0077* (2013.01)

(58) Field of Classification Search
CPC .................. G08B 13/19602; G08B 13/00; G08B 13/196; G08B 13/19613; G08B 13/19604;
(Continued)

(56) References Cited

U.S. PATENT DOCUMENTS

2002/0015094 A1    2/2002    Kuwano et al.
2014/0264035 A1*   9/2014    Kleihorst ............... G08B 13/19
                                                                250/342

FOREIGN PATENT DOCUMENTS

JP    H10-336630 A     12/1998
JP    2004-240471 A    8/2004
(Continued)

OTHER PUBLICATIONS

International Search Report issued in PCT/JP2021/047388; mailed Mar. 22, 2022.

*Primary Examiner* — Sherrie Hsia
(74) *Attorney, Agent, or Firm* — Studebaker Brackett PLLC

(57) ABSTRACT

A thermal image acquisition device (2) acquires a thermal image of a balcony (1). Setting circuitry (11) sets an outside area (15) corresponding to an outside of the balcony (1) and a balcony inside area (16) corresponding to inside of the balcony (1) in the thermal image. Heat source detection circuitry (9) detects a heat source (14) in the thermal image. Intrusion determination circuitry (12) determines that "there is an intrusion" if a central position of the heat source (14) with the number of pixels and a temperature equal to or greater than thresholds moves from the outside area (15) to the balcony inside area (16) in the thermal image. A determination result output device (13) outputs a determination result of the intrusion determination circuitry (12).

12 Claims, 12 Drawing Sheets

(58) Field of Classification Search
CPC . G01J 2005/0077; G01J 5/0025; G01J 5/0859
USPC .................................................. 348/155, 152
See application file for complete search history.

(56) References Cited

FOREIGN PATENT DOCUMENTS

| | | |
|---|---|---|
| JP | 2011-048594 A | 3/2011 |
| JP | 4950481 B2 | 6/2012 |
| WO | 2023/042310 A1 | 3/2023 |

\* cited by examiner

CRIME PREVENTION SYSTEM AND CRIME PREVENTION METHOD

FIELD

The present disclosure relates to a crime prevention system that monitors whether or not there is an intrusion into a balcony, and a crime prevention method.

BACKGROUND ART

According to statistics regarding crimes provided by the National Police Agency, intruders intrude into residences not only from entrance doors but also from balconies in many cases. In particular, in higher elevations of multiple dwelling houses, locking of windows is less likely to be cared than in the first floor, and security glass is less provided, which means that they have a low level of consciousness and do not take enough measures for crime prevention. Further, intruders can easily hide behind window backs in balconies, and thus, they can take time to intrude from windows. Still further, intruders can easily move to an adjacent residence through a partition provided between residences, which may add to the damage if the intruders can intrude into balconies once. For the reasons described above, crime prevention of balconies has become important.

Intruders intrude at any time of night or day, and thus, a crime prevention system capable of monitoring also in night-time is required. To meet this requirement, provision of security cameras that irradiate balconies with infrared light can be considered. However, it is necessary to provide high-resolution security cameras while making consideration of privacy of residents and neighborhood residents and strictly manage captured moving images, which makes the bar for introduction and operation high.

Further, in order to monitor whether or not there is an intrusion into a balcony, processing of detecting a person on software is required. For example, a crime prevention system that creates a 3D model of an object every time the object is detected by utilizing a distance sensor and always calculates a volume and change of form has also been proposed (see PTL 1).

CITATION LIST

Patent Literature

[PTL 1] JP 2011-048594 A

SUMMARY OF THE INVENTION

Problem to be Solved by the Invention

However, these crime prevention systems use complicated algorithm and require high-performance CPUs, and thus, sizes and power consumption of determination devices increase.

The present disclosure has been made to solve the problem as described above, and an object thereof is to provide a crime prevention system which can make a determination device smaller and reduce power consumption, and a crime prevention method.

Solution to Problem

A crime prevention system according to the present disclosure includes: a thermal image acquisition device acquiring a thermal image of a balcony: setting circuitry setting an outside area corresponding to an outside of the balcony and a balcony inside area corresponding to inside of the balcony in the thermal image; heat source detection circuitry detecting a heat source in the thermal image; intrusion determination circuitry determining that "there is an intrusion" if a central position of the heat source with the number of pixels and a temperature equal to or greater than thresholds moves from the outside area to the balcony inside area in the thermal image; and a determination result output device outputting a determination result of the intrusion determination circuitry.

Advantageous Effects of Invention

In the present disclosure, if the heat source with the number of pixels and a temperature equal to or greater than the thresholds is detected in the thermal image, and the central position of the heat source moves from the outside area to the balcony inside area, it is determined that "there is an intrusion". Whether or not the heat source is an intruder is determined only in accordance with whether the temperature and the number of pixels of the heat source are equal to or greater than the thresholds, so that it requires only a small calculation amount of the intrusion determination unit. Thus, in the crime prevention system that monitors whether or not there is an intrusion into a balcony, it is possible to make a determination device smaller and reduce power consumption.

DESCRIPTION OF EMBODIMENTS

A crime prevention system and a crime prevention method according to the embodiments of the present disclosure will be described with reference to the drawings. The same components will be denoted by the same symbols, and the repeated description thereof may be omitted.

First Embodiment

Figure 1:
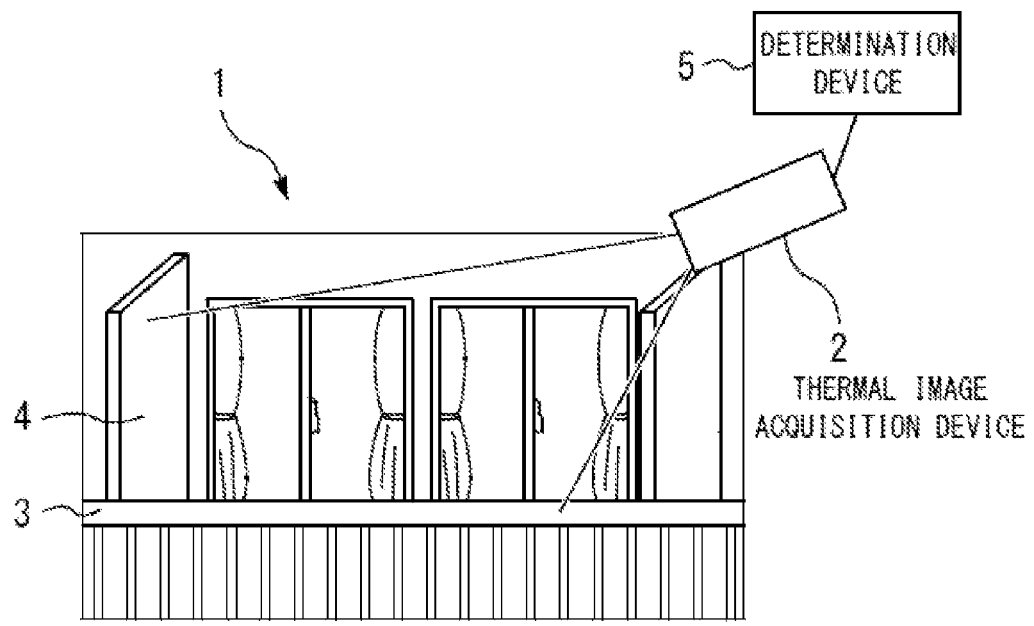
FIG. 1 is a view illustrating a method for mounting a thermal image acquisition device of a crime prevention system according to a first embodiment.

FIG. 1 is a view illustrating a method for mounting a thermal image acquisition device of a crime prevention system according to a first embodiment. A thermal image acquisition device 2 is mounted on a ceiling or a wall surface of a balcony 1 of each residence of multiple dwelling houses such as a condominium. Here, the balcony 1 is a portion which protrudes from a main house of the residence in contact externally, is surrounded by a window back 3, a wall or a partition 4, and is fitted into an eave or an awning, but the balcony 1 is not limited to this and may be a balcony with no eave.

In FIG. 1, one thermal image acquisition device 2 is mounted at one end of the balcony 1. The thermal image acquisition device 2, which is, for example, an infrared array sensor, captures an image of the balcony 1 to acquire a thermal image. As the infrared array sensor, a sensor in which infrared sensors such as, for example, bolometers, thermopiles and thermal diodes are arranged in a matrix can be used. Use of the infrared array sensor enables images of the balcony 1 to be captured also at midnight while making consideration of privacy. A determination device 5 determines whether an intruder intrudes into the balcony 1 based on the acquired thermal image. Note that the thermal image acquisition devices 2 may be provided at both ends of the balcony 1 of each residence to capture images of the balcony 1 from opposite sides to each other.

Figure 2:
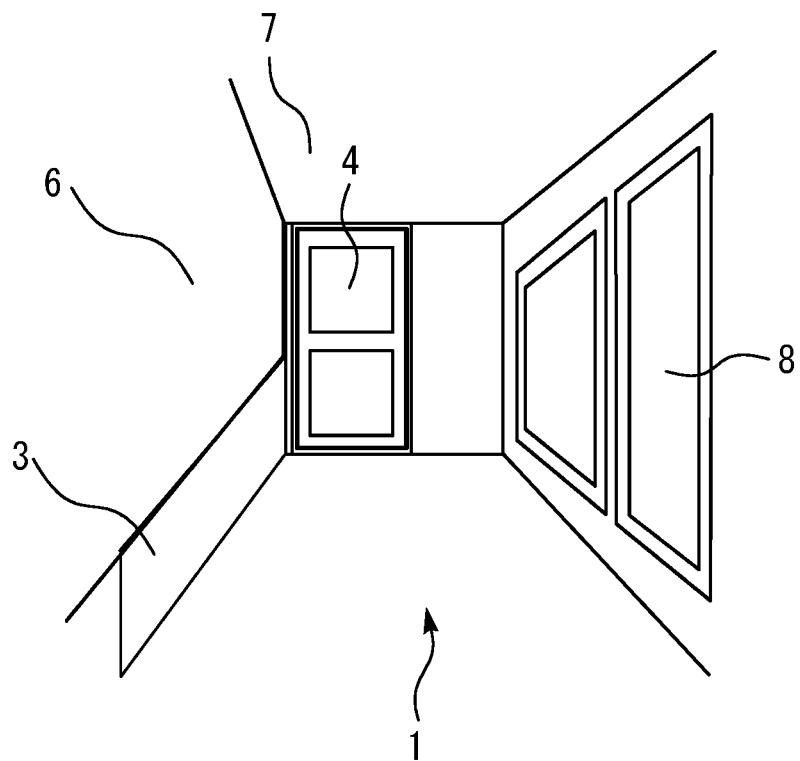
FIG. 2 is a view illustrating scenery that can be viewed from the thermal image acquisition device.

FIG. 2 is a view illustrating scenery that can be viewed from the thermal image acquisition device. A borderline between the window back 3 of the balcony 1 and outside 6 obliquely extends by a natural law of perspective. In a similar manner, a borderline between a ceiling 7 and the outside 6 obliquely extends. A partition 4 is provided between the balcony 1 and a balcony of the adjacent residence. The outside 6 is surrounded by the window back 3, an edge of the ceiling 7 and an edge of the partition 4. A window 8 is provided between a room interior and the balcony 1.

Figure 3:
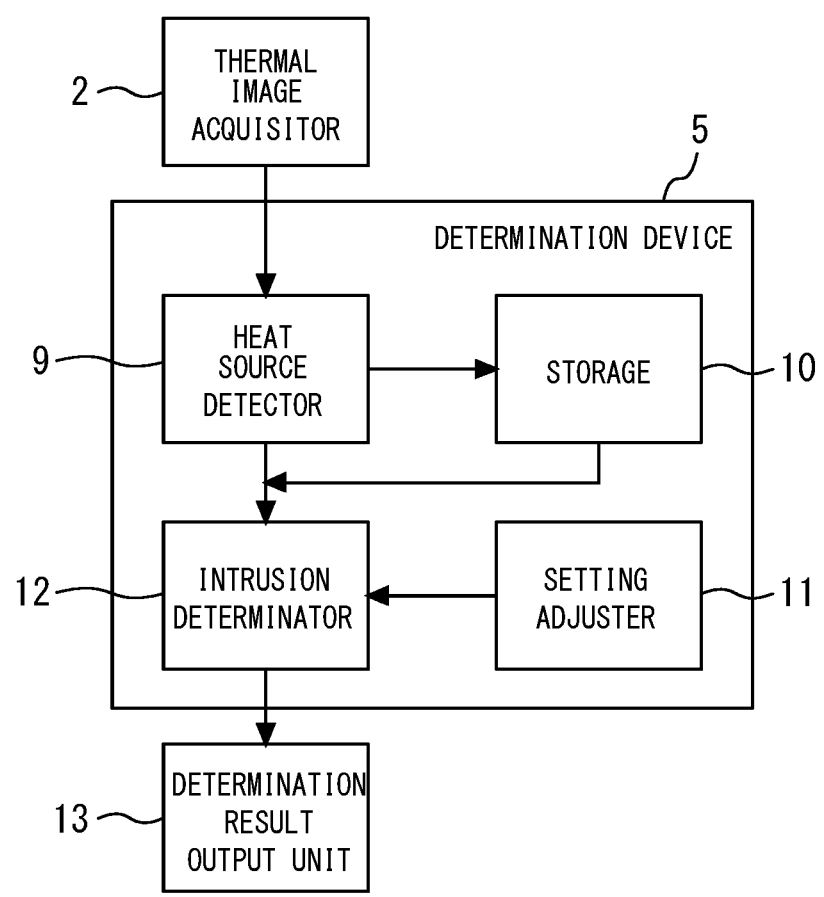
FIG. 3 is a block diagram illustrating the crime prevention system according to the first embodiment.

FIG. 3 is a block diagram illustrating the crime prevention system according to the first embodiment. The determination device 5 includes a heat source detection unit 9, a storage 10, a setting unit 11 and an intrusion determination unit 12. A determination result output device 13 outputs a determination result by the intrusion determination unit 12.

The heat source detection unit 9 detects a heat source with the number of pixels and a temperature equal to or greater than thresholds set in advance as a heat source corresponding to an intruder in the acquired thermal image. The storage 10 stores the thermal image from which the heat source has been detected by the heat source detection unit 9.

The threshold of the temperature is higher than a reference temperature by a designated temperature. The reference temperature is a temperature of an infrared sensor measured with a thermistor or a temperature IC incorporated into the infrared camera or a temperature of a mechanical shutter incorporated into the infrared camera. The designated temperature is arbitrarily set by a user and input upon initial setting. Note that it is preferable to count the number of pixels of heat sources and exclude a size less than a predetermined minimum size. This can reduce erroneous detection.

Figure 4:
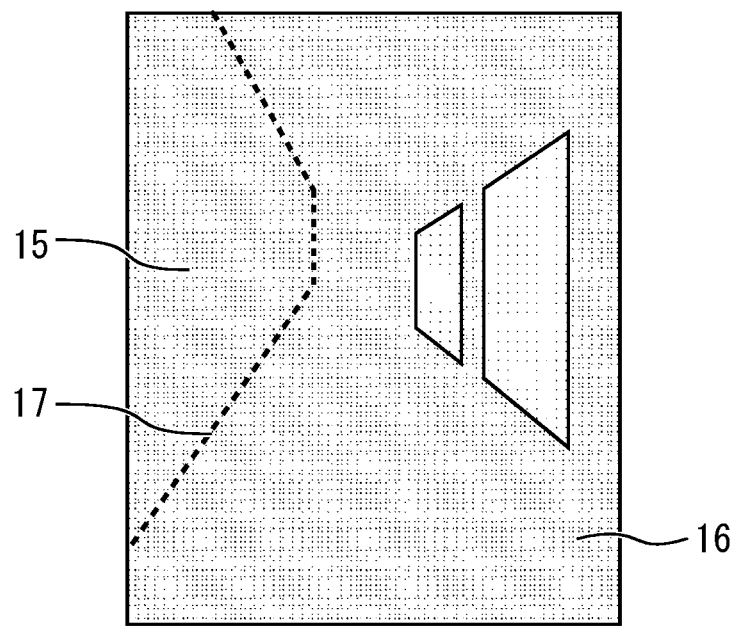
FIG. 4 is a view illustrating the thermal image in which the area is set by the setting unit according to the first embodiment.
Figure 5:
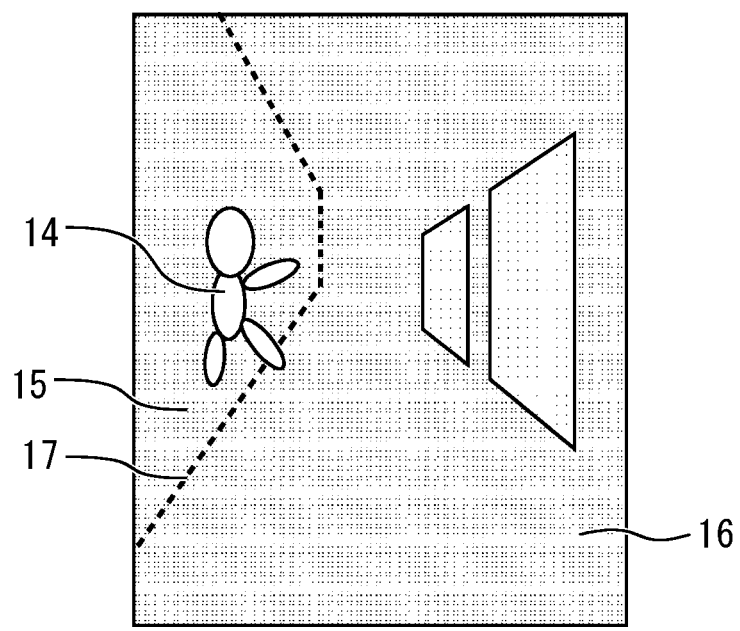
FIG. 5 is a view illustrating the thermal image in which the area is set by the setting unit according to the first embodiment.

The setting unit 11 sets an area within the thermal image using software. FIG. 4 and FIG. 5 are views illustrating the thermal image in which the area is set by the setting unit according to the first embodiment. FIG. 4 illustrates a state where there is no intruder. A temperature in the balcony 1 is different from a temperature inside the room, and thus, a portion of the window 8 is displayed as a different temperature in the thermal image. FIG. 5 illustrates a state where an intruder intrudes. The intruder is displayed as a heat source 14.

The setting unit 11 sets an outside area 15 corresponding to the outside 6 of the balcony 1 and a balcony inside area 16 corresponding to inside of the balcony 1 in the thermal image. The outside area 15 is surrounded by a reference line 17 corresponding to the window back 3 of the balcony 1, the edge of the ceiling 7 and the edge of the partition 4. The outside area 15 is divided from the balcony inside area 16 by the reference line 17. These areas within the thermal image can be easily set by the user on software, and thus, it is not necessary for contractors to perform masking to set detection areas as in a pyroelectric sensor.

Figure 6:
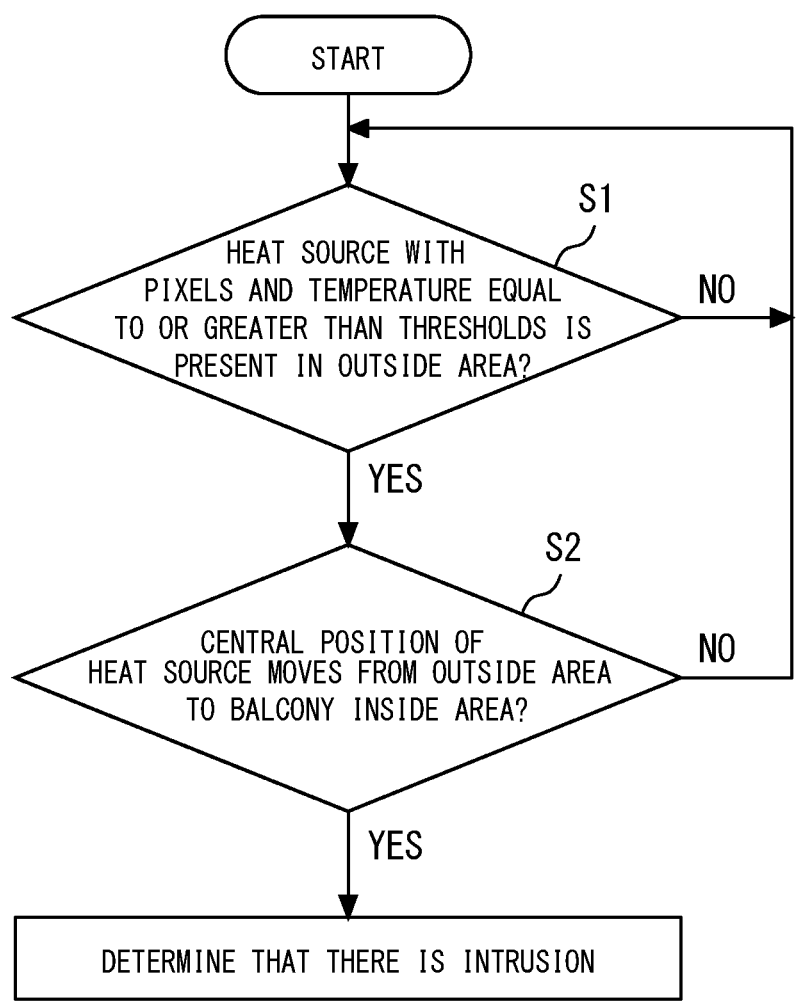
FIG. 6 is a flowchart of operation of the intrusion determination unit according to the first embodiment.

FIG. 6 is a flowchart of operation of the intrusion determination unit according to the first embodiment. In a case where an intruder intrudes into a balcony from outside, as illustrated in FIG. 5, a heat source appearing in the outside area 15 moves to the balcony inside area 16. Thus, the intrusion determination unit 12 first determines whether the heat source 14 with the number of pixels and a temperature equal to or greater than thresholds is present in the outside area 15 (step S1). Then, the intrusion determination unit 12 determines that "there is an intrusion" if a central position of the heat source 14 moves from the outside area 15 to the balcony inside area 16 (step S2). Note that in a case where intrusion of a plurality of heat sources is detected, the intrusion determination unit 12 may detect the number of the heat sources and make a notification of the number.

In a case where an intruder wears heavy clothes in winter, there is a case where the heat source 14 corresponding to an entire body of the intruder cannot be acquired. However, an entire body of an intruder is not necessarily required to be identified to detect an intrusion, and it is only necessary to adjust the thresholds of the number of pixels and the temperature so as to enable detection of a heat generation portion around the face. Further, the intrusion determination unit 12 can improve detection sensitivity as to whether or not the heat source 14 is an intruder through image processing such as image averaging between frames or edge extraction filtering. Note that the intrusion determination unit 12 may learn information of intruders through machine learning in advance and detect whether or not the heat source 14 is an intruder by using the learning results. Histogram of oriented gradient (HOG) characteristics, or the like, which use gradient information of a luminance value is used as a detection method, and support vector machine (SVM), or the like, is used in learning. Further, a method using deep learning such as single shot multi box detector (SSD) and you only look once (YOLO) may be used.

The determination result output device 13, which is, for example, a display, a mobile phone or a tablet terminal that displays a thermal image, notifies residents, concierges, a security company, and the like, of the determination result by the determination device 5. The determination device 5 transmits information to the determination result output device 13 through wireless connection such as Wi-Fi®, Bluetooth® and 4G/5G or wired connection such as a communication cable and a wired LAN.

As described above, in the present embodiment, if the heat source 14 with the number of pixels and a temperature equal to or greater than the thresholds is detected in the thermal image, and the central position of the heat source 14 moves from the outside area 15 to the balcony inside area 16, it is determined that "there is an intrusion". Whether or not the heat source is an intruder is determined only in accordance with whether the temperature and the number of pixels of the heat source 14 are equal to or greater than the thresholds, so that it requires only a small calculation amount of the intrusion determination unit 12. Thus, in the crime prevention system that monitors whether or not there is an intrusion into a balcony, it is possible to make a determination device smaller and reduce power consumption.

Further, it is determined that "there is an intrusion" if the heat source 14 moves from the outside area 15 to the balcony inside area 16, and thus, a resident going out to the balcony 1 is less likely to be erroneously detected. It is therefore possible to provide a crime prevention system capable of monitoring all day and all night without requiring switch to a security mode. However, in a case where a resident watches outside from the balcony 1, the heat source 14 is detected at the same time in the outside area 15 and the balcony inside area 16. Thus, the intrusion determination unit 12 preferably determines that "there is an intrusion" if the heat source 14 moves to the balcony inside area 16 after the heat source 14 is detected only in the outside area 15. This can prevent erroneous detection of an intruder.

Further, the balconies 1 of respective residences of multiple dwelling houses often have the same structure, and thus, setting at the balcony 1 of one residence can be also applied to other residences substantially without change, so that system construction is easy.

Further, for example, in a case where an intrusion is detected by monitoring a shape using a distance image sensor (ToF), or the like, there is a possibility that a moving non-living material such as laundry may be erroneously detected. In contrast, in the present embodiment, a temperature of a target is detected, and thus, there is no possibility of erroneous detection of a non-living material. Further, while with a ToF sensor, there is a possibility that a distance may be misidentified when it rains, an infrared sensor uses light with a long wavelength, so that it is possible to perform monitoring with high accuracy even when it rains.

Further, the determination result output device 13 outputs a thermal image to an outside concierge or a security company only in a case where the intrusion determination unit 12 determines that "there is an intrusion". The thermal image is output, and thus, not only whether or not there is an intrusion, but also movement after the intrusion can be monitored. By outputting a thermal image only in a case where an intrusion is detected, it is possible to monitor movement of an intruder from outside at any time of night or day while making consideration of privacy of residents.

By a natural law of perspective, a heat source becomes great in a case where an intruder is located near the thermal image acquisition device 2, and a heat source becomes small in a case where an intruder is located in the back. It is therefore preferable to set a greater threshold for the number of pixels of the heat source 14 for an area closer to the thermal image acquisition device 2 in the thermal image. However, in a case where the balcony 1 is small, influence of a natural law of perspective is small, and thus, it is not necessary to change the threshold of the number of pixels.

Figure 7:
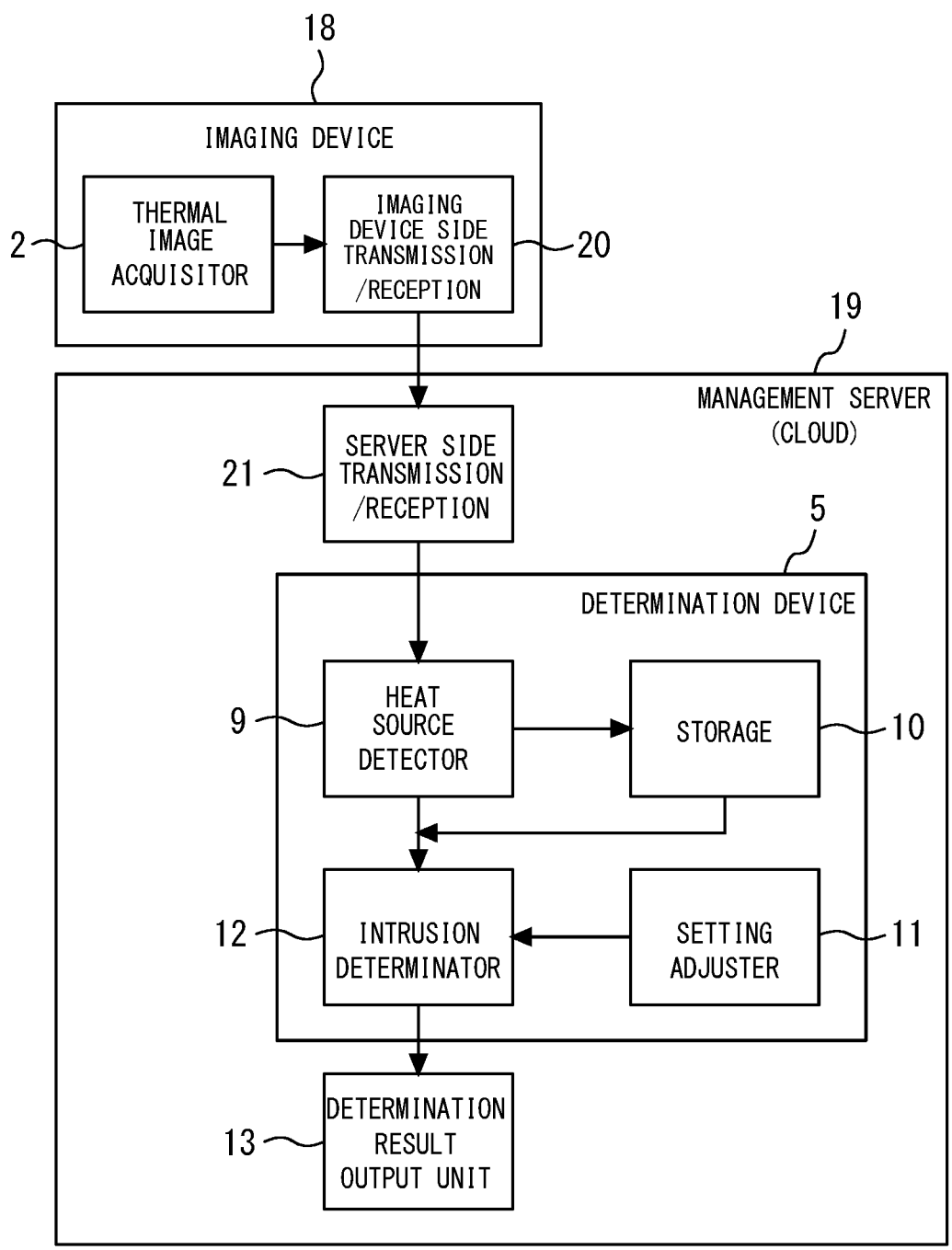
FIG. 7 is a block diagram illustrating a modification of the crime prevention system according to the first embodiment.

FIG. 7 is a block diagram illustrating a modification of the crime prevention system according to the first embodiment. While in FIG. 3, the thermal image acquisition device 2 and the determination device 5 are mounted on one security camera, in FIG. 7, an imaging device 18 on which the thermal image acquisition device 2 is mounted and a management server 19 on which the determination device 5 is mounted are separately provided. An imaging device side transmission/reception unit 20 of the imaging device 18 transmits/receives data to/from a server side transmission/reception unit 21 of the management server 19. The management server 19 may be a cloud server. The thermal image acquired by the thermal image acquisition device 2 of the imaging device 18 is transmitted via the Internet, or the like, and subjected to data processing on the management server 19 side. Note that one management server 19 may be provided for a plurality of imaging devices 18.

Figure 8:
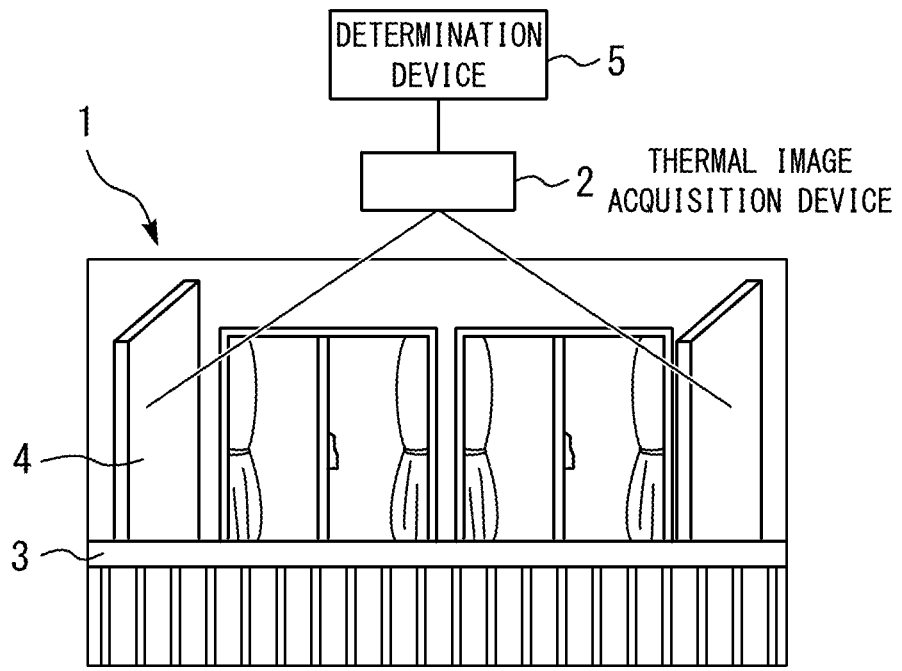
FIG. 8 is a view illustrating a first modification of a method for mounting the thermal image acquisition device of the crime prevention system according to the first embodiment.

FIG. 8 is a view illustrating a first modification of a method for mounting the thermal image acquisition device of the crime prevention system according to the first embodiment. One thermal image acquisition device 2 is mounted at the center of a ceiling of the balcony 1. In order to capture an image of all the edge of the ceiling 7, the window back 3, inside the balcony 1, the window 8, the partition 4, and the like, it is necessary to use a wide-angle lens in the thermal image acquisition device 2. In this case, the thermal image includes distortion of the lens, and thus, it is necessary to correct the distortion through image processing.

Figure 9:
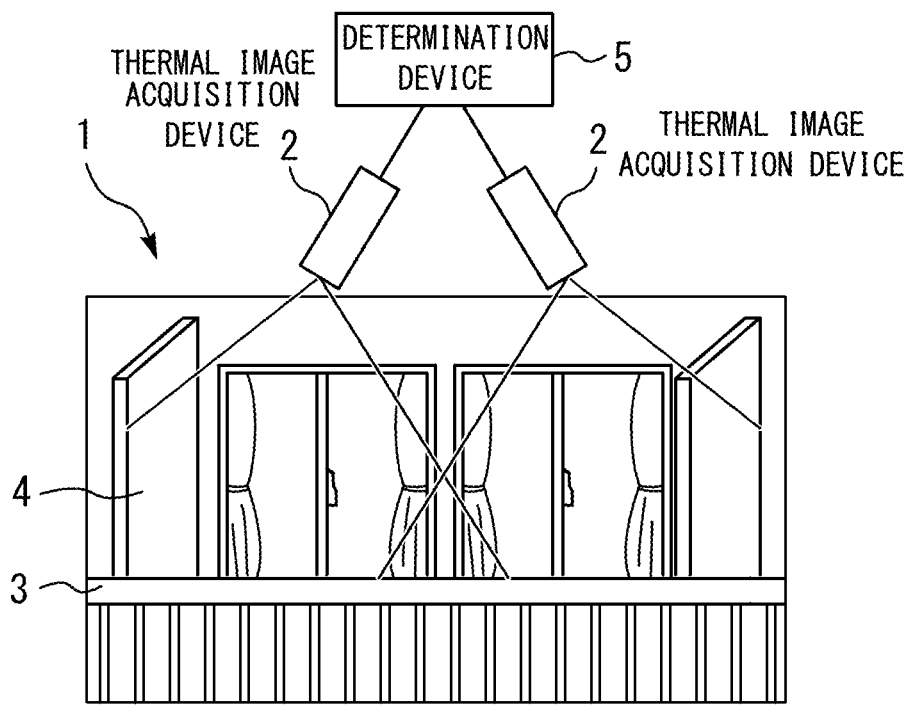
FIG. 9 is a view illustrating a second modification of the method for mounting the thermal image acquisition device of the crime prevention system according to the first embodiment.

FIG. 9 is a view illustrating a second modification of the method for mounting the thermal image acquisition device of the crime prevention system according to the first embodiment. Two thermal image acquisition devices 2 are mounted at the center of the ceiling of the balcony 1. The two thermal image acquisition devices 2 respectively capture images in different directions. However, it is necessary to make settings so that ranges of view of the thermal image acquisition devices 2 overlap with each other at a central portion of the balcony 1 so as to avoid creation of an area for which an image cannot be captured.

Second Embodiment

Figure 10:
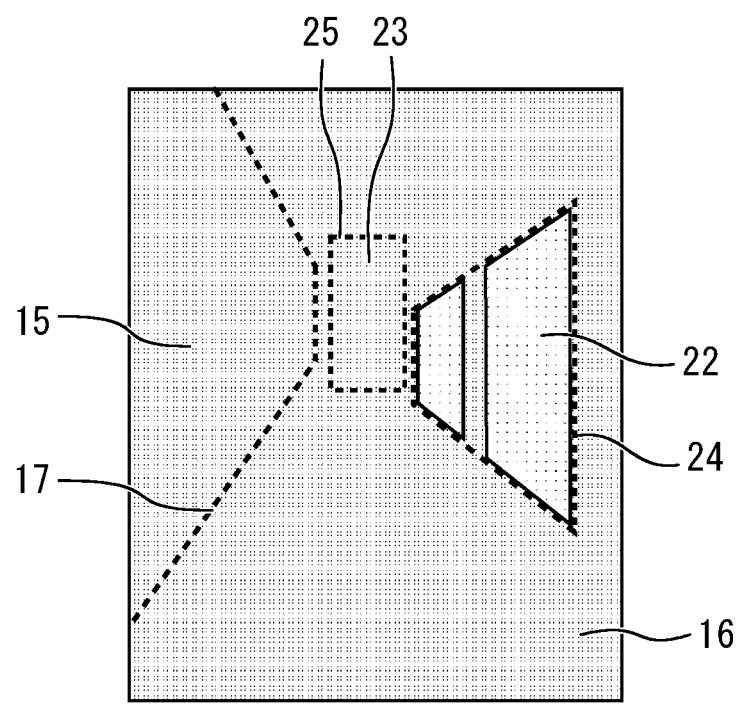
FIG. 10 is a view illustrating a thermal image in which areas are set by a setting unit according to a second embodiment.

FIG. 10 is a view illustrating a thermal image in which areas are set by a setting unit according to a second embodiment. The setting unit 11 sets a window area 22 corresponding to the window 8 and a partition area 23 corresponding to the partition 4 in the thermal image. The window area 22 is surrounded by a reference line 24. The partition area 23 is surrounded by a reference line 25. Note that a plurality of windows 8 and partitions 4 may be provided. For example, two window areas 22 and two partition areas 23 may be provided. In this case, a size of each area can be freely set by changing the reference line.

Figure 11:
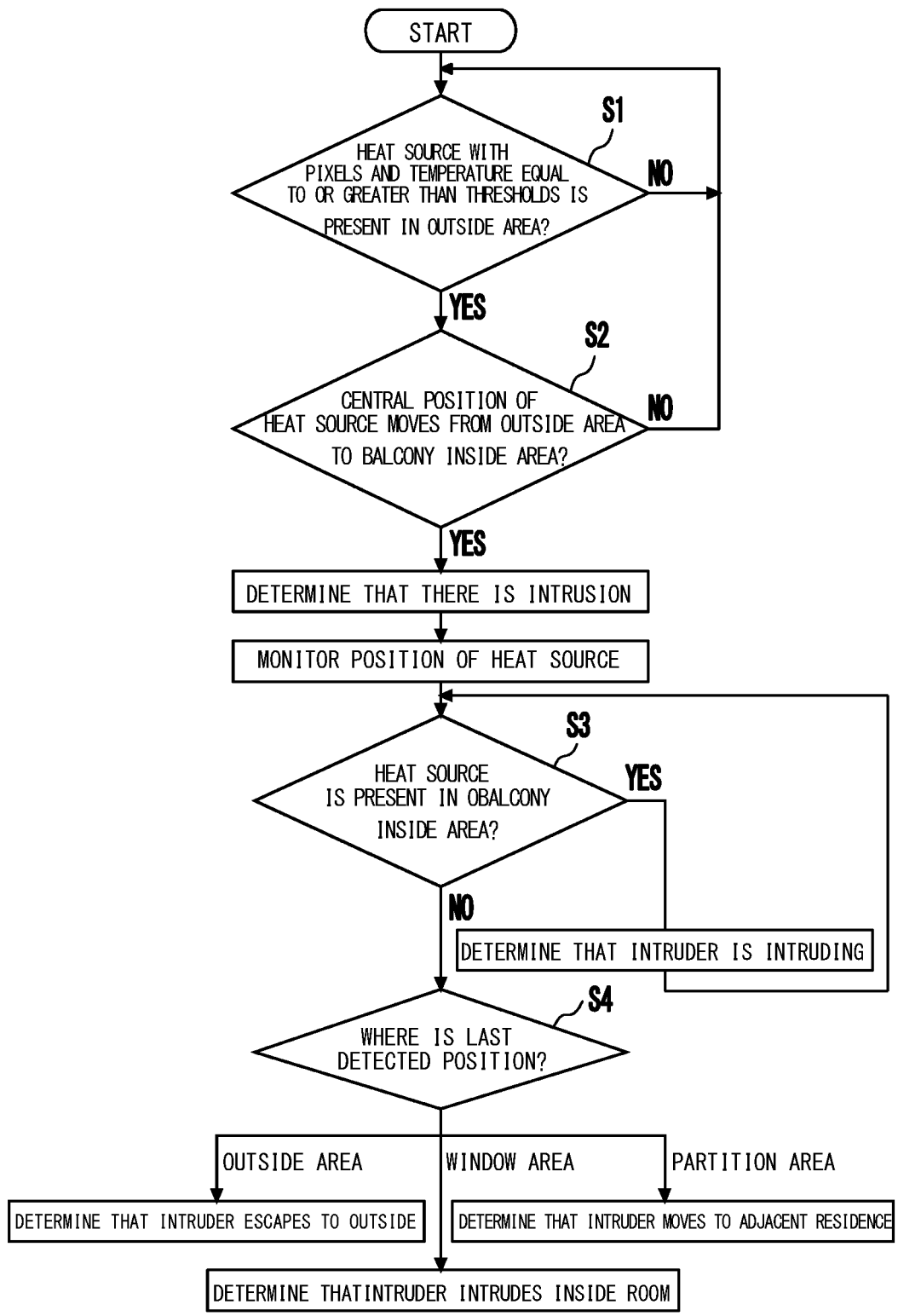
FIG. 11 is a flowchart of operation of an intrusion determination unit according to the second embodiment.

FIG. 11 is a flowchart of operation of an intrusion determination unit according to the second embodiment. The heat source detection unit 9 continues to monitor a position of the heat source 14 also after it is determined that "there is an intrusion", to determine a state of the intruder. The storage 10 records movement history of the detected heat source 14 and transmits the movement history to the intrusion determination unit 12. Specifically, the intrusion determination unit 12 confirms whether the heat source 14 is present in the balcony inside area 16 (step S3). As long as the heat source 14 is present in the balcony inside area 16, the intrusion determination unit 12 determines that an intruder is "intruding" and continues to issue an alarm.

In a case where after it is determined that "there is an intrusion", the heat source 14 is no longer detected in the balcony inside area 16, the intrusion determination unit 12 determines movement of the intruder thereafter based on a last detected position of the heat source 14 (step S4). In a case where the last detected position is the outside area 15, it can be considered that the intruder escapes to the outside 6 from the balcony 1, and thus, the intrusion determination unit 12 determines that the intruder "escapes to outside". In a case where the last detected position is the window area 22, it can be considered that the intruder intrudes inside the room from the window, and thus, the intrusion determination unit 12 determines that the intruder "intrudes inside the room". In a case where the last detected position is the partition area 23, it can be considered that the intruder moves to the adjacent residence through the partition 4, and thus, the intrusion determination unit 12 determines that the intruder "moves to the adjacent residence". The residents, concierges and management company are notified of these determination results through the determination result output device 13.

According to the present embodiment, whether an intruder intrudes inside the room from the window 8, moves to the adjacent residence, stays in the balcony 1 or escapes to outside after the intruder intrudes in the balcony 1 which is difficult to be seen from outside, can be known. It is therefore possible to reduce a risk of residents and an intruder bumping into each other and allow the concierges and the management company to appropriately handle the intrusion in accordance with circumstances. Further, it is only necessary to provide the thermal image acquisition device 2 as a sensor, and it is not necessary to provide a complicated system in which sensors are respectively provided at the window back 3, the partition 4 and the window 8 to detect an intruder. Further, the above-described determination and warning are performed by being triggered by detection of an intruder, which eliminates trouble of setting a security mode, so that it is possible to prevent malfunction due to forgetting to release the security mode.

Third Embodiment

Figure 12:
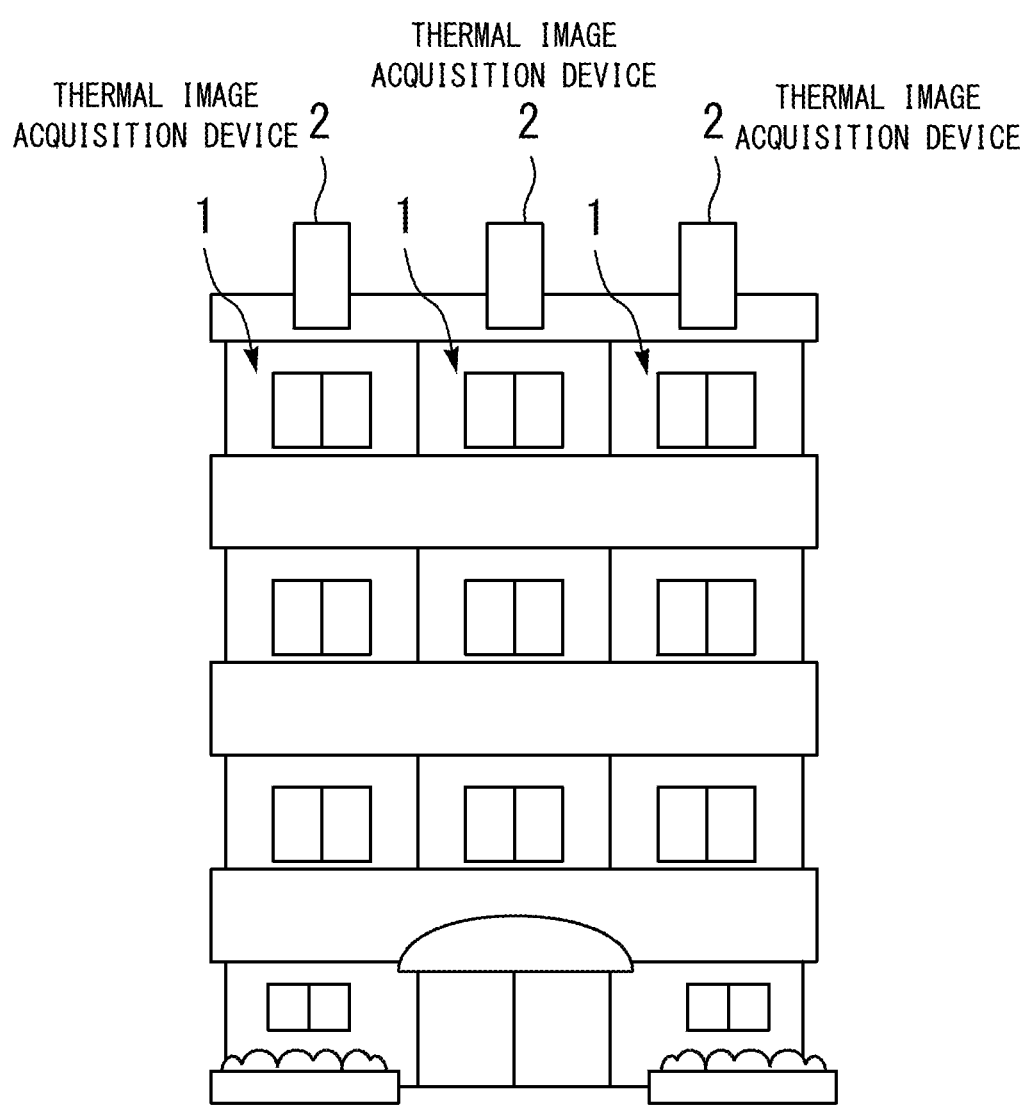
FIG. 12 is a view illustrating multiple dwelling houses in which a crime prevention system according to a third embodiment is installed.

FIG. 12 is a view illustrating multiple dwelling houses in which a crime prevention system according to a third embodiment is installed. The thermal image acquisition devices 2 are respectively provided at the balconies 1 of a plurality of residences of the multiple dwelling houses in which residences are continuously provided like a condominium.

Figure 13:
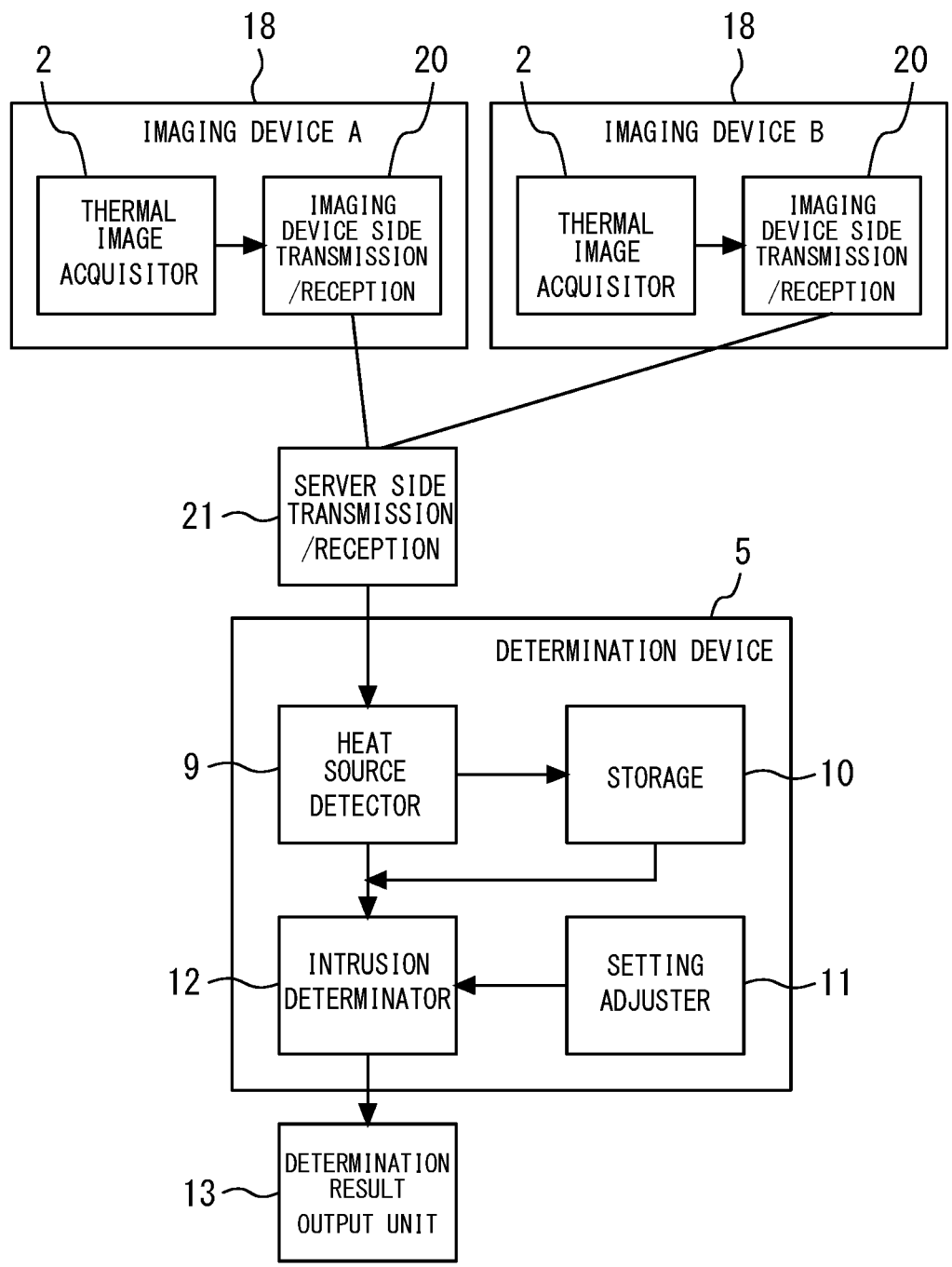
FIG. 13 is a block diagram illustrating the crime prevention system according to the third embodiment.

FIG. 13 is a block diagram illustrating the crime prevention system according to the third embodiment. Thermal images from the thermal image acquisition devices 2 provided at the balconies 1 of the respective residences are input to the determination device 5. In a case where it is determined that "there is an intrusion" for the balcony 1 of one residence, and it is determined that the last detected position is the partition area 23, the thermal image acquisition device 2 of the balcony 1 of the adjacent residence acquires the thermal image, and the intrusion determination unit 12 continuously monitors the position of the heat source 14 in the thermal image to determine a state of the intruder.

By making a monitoring system using the thermal image of the adjacent residence coordinate in this manner, it is possible to continue to monitor even in a case where an intruder moves to the adjacent residence through the partition 4. This is not only helpful in catching the intruder, but also can guide residents of the adjacent residence for evacuation or prevent residents and the intruder from bumping into each other.

Fourth Embodiment

Figure 14:
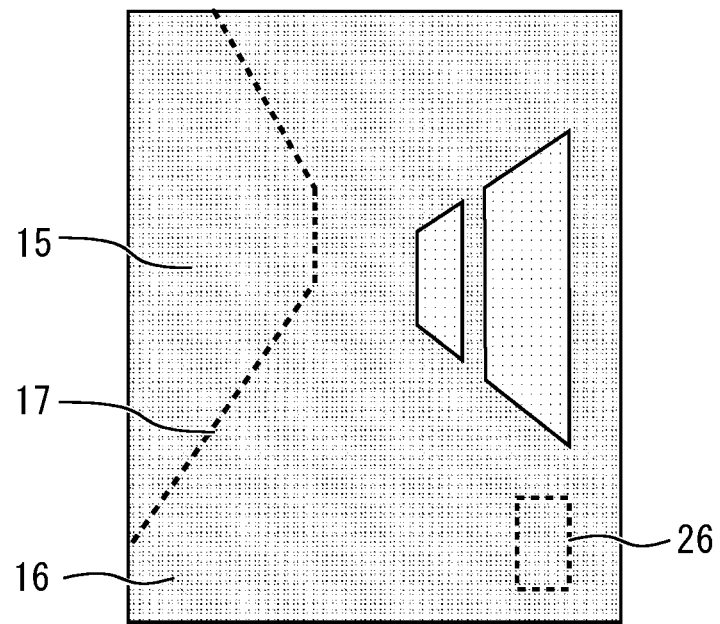
FIG. 14 is a view illustrating a thermal image in which areas are set by a setting unit according to a fourth embodiment.

FIG. 14 is a view illustrating a thermal image in which areas are set by a setting unit according to a fourth embodiment. The setting unit 11 sets a monitoring exclusion area 26 in the thermal image. The intrusion determination unit 12 does not perform monitoring for the heat source 14 present in the monitoring exclusion area 26.

For example, an object for which a temperature changes such as an exterior unit of an air conditioner placed on the balcony 1 becomes a heat generation source or a cooling source. Thus, an area corresponding to the exterior unit is set as a monitoring exclusion area 26 in the thermal image. This can prevent erroneous detection by a heat generation source or a cooling source. Further, a temperature of a floor of the balcony 1 becomes high in summer, and thus, the floor of the balcony 1 may be set as the monitoring exclusion area. Note that while in a case where a pyroelectric sensor is used to monitor the balcony, contractors has performed physical masking on the pyroelectric sensor, such a work is not required, and residents can easily set the monitoring exclusion area 26 using software.

Fifth Embodiment

Figure 15:
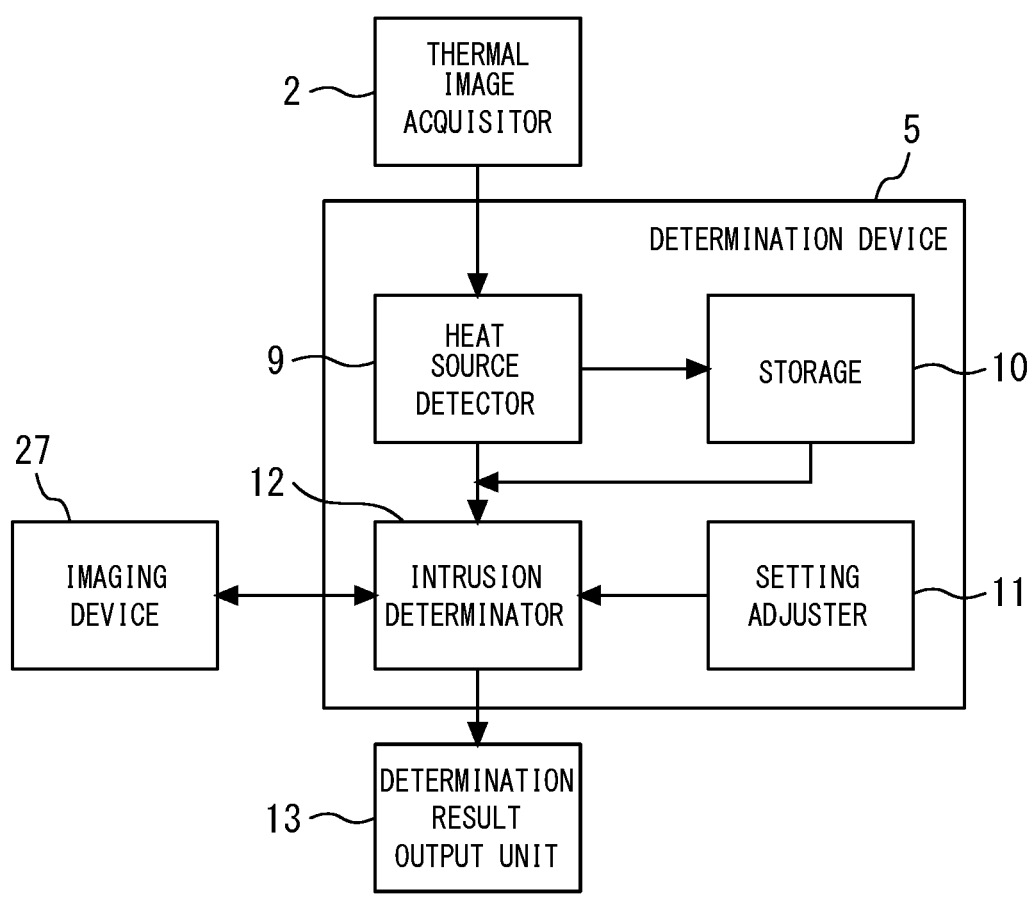
FIG. 15 is a block diagram illustrating a crime prevention system according to a fifth embodiment.

FIG. 15 is a block diagram illustrating a crime prevention system according to a fifth embodiment. In the present embodiment, an imaging device 27 is mounted at an entrance door of each residence. The imaging device 27 operates only in a case where the mode becomes a security mode as a result of the intrusion determination unit 12 determining that "there is an intrusion" and captures an image of the entrance door. While an infrared array sensor is used as the imaging device 27 in a similar manner to the thermal image acquisition device 2, a visible camera may be used. In a case where the imaging device 27 detects a person who goes out from the entrance door after an intrusion is detected at the balcony 1, the intrusion determination unit 12 determines that the intruder escapes to a common use space from the entrance door and makes a notification accordingly. By this means, it is possible to monitor all of intrusion routes and escape routes of the intruder. It is therefore possible to prevent crimes in the whole multiple dwelling houses and make it easier to catch the intruder and evacuate residents.

REFERENCE SIGNS LIST 1 balcony; 2 thermal image acquisition device; 3 window back; 7 ceiling; 9 heat source detection unit; 11 setting unit; 12 intrusion determination unit; 13 determination result output device; 14 heat source; 15 outside area; 16 balcony inside area; 26 monitoring exclusion area; 27 imaging device

The invention claimed is:

1. A crime prevention system comprising:
a thermal image acquisition device acquiring a thermal image of a balcony;
setting circuitry setting an outside area corresponding to an outside of the balcony and a balcony inside area corresponding to inside of the balcony in the thermal image;
heat source detection circuitry detecting a heat source in the thermal image;
intrusion determination circuitry determining that "there is an intrusion" if a central position of the heat source with the number of pixels and a temperature equal to or greater than thresholds moves from the outside area to the balcony inside area in the thermal image; and
a determination result output device outputting a determination result of the intrusion determination circuitry.

2. The crime prevention system according to claim 1, wherein the outside area is surrounded by a reference line corresponding to a window back of the balcony and an edge of a ceiling.

3. The crime prevention system according to claim 1, wherein the intrusion determination circuitry determines that "there is an intrusion" if the heat source moves to the balcony inside area after the heat source is detected only in the outside area.

4. The crime prevention system according to claim 1, wherein the determination result output device outputs the thermal image only in a case where the intrusion determination circuitry determines that "there is an intrusion".

5. The crime prevention system according to claim 1, wherein a greater threshold for the number of pixels of the heat source is set for an area closer to the thermal image acquisition device in the thermal image.

6. The crime prevention system according to claim 1, wherein the intrusion determination circuitry continues to monitor a position of the heat source after it is determined that "there is an intrusion", to determine a state of the intruder.

7. The crime prevention system according to claim 6, wherein the setting circuitry sets a window area corresponding to a window and a partition area corresponding to a partition in the thermal image,
if a last detected position of the heat source is the outside area in a case where the heat source is no longer detected in the balcony inside area after it is determined that "there is an intrusion", the intrusion determination circuitry determines that the intruder "escapes to outside",
if the last detected position is the window area, the intrusion determination circuitry determines that the intruder "intrudes inside the room", and
if the last detected position is the partition area, the intrusion determination circuitry determines that the intruder "moves to an adjacent residence".

8. The crime prevention system according to claim 7, wherein the thermal image acquisition devices are respectively provided at balconies of a plurality of residences of multiple dwelling houses, and
if it is determined that "there is an intrusion" for the balcony of one residence, and it is determined that the last detected position is the partition area, the intrusion determination circuitry continuously monitors a position of the heat source in the thermal image acquired by the thermal image acquisition device of the balcony of the adjacent residence to determine a state of the intruder.

9. The crime prevention system according to claim 1, wherein the setting circuitry sets a monitoring exclusion area in the thermal image, and
the intrusion determination circuitry does not perform monitoring for the heat source present in the monitoring exclusion area.

10. The crime prevention system according to claim 1, further comprising an imaging device operating and capturing an image of an entrance door when the intrusion determination circuitry determines that "there is an intrusion".

11. The crime prevention system according to claim 10, wherein if the imaging device detects a person who goes out from the entrance door after the intrusion determination circuitry determines that "there is an intrusion", the intrusion determination circuitry determines that the intruder escaped from the entrance door.

12. A crime prevention method comprising:
acquiring a thermal image of a balcony by a thermal image acquisition device;
setting an outside area corresponding to an outside of the balcony and a balcony inside area corresponding to inside of the balcony in the thermal image by setting circuitry;
detecting a heat source in the thermal image by heat source detection circuitry;
determining that "there is an intrusion" by intrusion determination circuitry if a central position of the heat source with the number of pixels and a temperature equal to or greater than thresholds moves from the outside area to the balcony inside area in the thermal image; and
outputting a determination result of the intrusion determination circuitry by a determination result output device.

* * * * *